US012774873B2

(12) United States Patent
Keller

(10) Patent No.: US 12,774,873 B2
(45) Date of Patent: Oct. 27, 2026

(54) DARTS SCORING METHOD

(71) Applicant: Gravity Brands Limited, Harlow (GB)

(72) Inventor: Adrian Keller, Kloten (CH)

(73) Assignee: Gravity Brands Limited, Harlow (GB)

( * ) Notice: Subject to any disclaimer, the term of this patent is extended or adjusted under 35 U.S.C. 154(b) by 0 days.

(21) Appl. No.: 18/885,157

(22) Filed: Sep. 13, 2024

(65) Prior Publication Data

US 2025/0093134 A1 Mar. 20, 2025

(30) Foreign Application Priority Data

Sep. 15, 2023 (GB) ..................................... 2314147

(51) Int. Cl.
*F41J 3/02* (2006.01)
*F41J 3/00* (2006.01)
*G06T 7/73* (2017.01)
*G06V 10/75* (2022.01)

(52) U.S. Cl.
CPC ............... *F41J 3/02* (2013.01); *F41J 3/0009* (2013.01); *G06T 7/74* (2017.01); *G06V 10/751* (2022.01)

(58) Field of Classification Search
None
See application file for complete search history.

(56) References Cited

U.S. PATENT DOCUMENTS 3,836,148 A 9/1974 Manning
4,678,194 A 7/1987 Bowyer et al.
5,577,733 A 11/1996 Downing
6,089,571 A 7/2000 Cho
6,155,570 A 12/2000 Allison et al.
6,439,576 B1 8/2002 Montague
(Continued)

FOREIGN PATENT DOCUMENTS

CN 106940155 A 7/2017
CN 107850417 A 3/2018
(Continued)

OTHER PUBLICATIONS

Alexander Freytag et al., DE102016013028 English translation, Mar. 5, 2018.*

(Continued)

*Primary Examiner* — Jason T Yen
(74) *Attorney, Agent, or Firm* — Withrow + Terranova, PLLC; Vincent K. Gustafson

(57) ABSTRACT

A method of determining a score of a dart in a dartboard play surface utilizes a plurality of cameras at a non-zero angle relative to the play surface, the method comprising: calculating a homography matrix for each camera for transforming a captured image from a camera view to a front-view of the dartboard; capturing a first image of the dartboard using each camera at a first time, and capturing a second image of the dartboard using each camera (with the dart being in the play surface) at a subsequent second time; producing differential scoring images by comparing each first image to the second image captured by the respective camera; using at least two of the differential scoring images with their respective homography matrices to determine a location of intersection between the dart and the play surface; and determining a score based on the determined location of intersection.

18 Claims, 6 Drawing Sheets

(56) References Cited

U.S. PATENT DOCUMENTS

| | | | | |
|---|---|---|---|---|
| 7,175,182 | B2 | 2/2007 | Pan et al. | |
| 7,624,988 | B2 | 12/2009 | Shao | |
| 10,126,102 | B2 | 11/2018 | Teng et al. | |
| 10,443,987 | B2 | 10/2019 | Hollinger et al. | |
| 10,443,988 | B2 | 10/2019 | Macher | |
| 2011/0031696 | A1* | 2/2011 | Su | F41J 5/02 273/371 |
| 2011/0109045 | A1 | 5/2011 | Su et al. | |
| 2012/0083342 | A1* | 4/2012 | Cross | F41J 3/0009 273/371 |
| 2019/0063883 | A1 | 2/2019 | Zhang et al. | |
| 2020/0038743 | A1* | 2/2020 | Chung | A63F 9/02 |
| 2022/0292709 | A1 | 9/2022 | Kim | |
| 2022/0341716 | A1 | 10/2022 | McNally et al. | |
| 2022/0373304 | A1 | 11/2022 | Teng et al. | |
| 2024/0060752 | A1* | 2/2024 | Lee | G06V 10/24 |

FOREIGN PATENT DOCUMENTS

| | | | |
|---|---|---|---|
| CN | 216348095 | U | 4/2022 |
| DE | 4207497 | A1 | 9/1993 |
| DE | 202004011475 | U1 | 10/2004 |
| DE | 102004035547 | B3 | 3/2006 |
| DE | 102016013028 | A1 | 5/2018 |
| DE | 102017113575 | A1 | 12/2018 |
| EP | 0182397 | A1 | 5/1986 |
| FR | 2876787 | A1 | 4/2006 |
| GB | 2133296 | A | 7/1984 |
| GB | 2418371 | A | 3/2006 |
| HU | P1800318 | A1 | 4/2020 |
| KR | 101032331 | B1 | 5/2011 |
| WO | 1995004251 | A1 | 2/1995 |
| WO | 2016029129 | A1 | 2/2016 |
| WO | 2016203194 | A1 | 12/2016 |
| WO | 2019143713 | A1 | 7/2019 |
| WO | 2021037326 | A1 | 3/2021 |

OTHER PUBLICATIONS

DE102016013028 English translation (Year: 2018).*

501 Entertainment Ltd, “501 FUN—Our Products,” [website], available as early as Jun. 2022 online: <URL: https://www.501fun.com/our-products>, 8 pages.

Cubik Innovation, “3.3 Steelity Automatic Scoring System,” TECH NOTE, Automatic scoring investigation, Jun. 22, 2022, 2 pages.

Dartsee, “Automatic darts scoring using webcams v3,” [screenshots from YouTube video], Mar. 29, 2024, available online: <URL: https://www.youtube.com/watch?v=AJhCRuvOhkM>, 14 pages.

Dartsee Ltd, “Dartsee—Automatic Darts Scoring,” [website], available as early as Jun. 2022 online: <URL: https://www.dartsee.com>, 7 pages.

Escalade Sports, “Prodigy Dartboards: Revolutionizing the Game of Darting,” [website], available as early as Jun. 2022 online: <URL: https://www.escaladesports.com/pages/prodigy-darts-technology>, 10 pages.

Flight Club Darts, “Social Darts,” [website], available as early as Jun. 2022 online: <URL: https://flightclubdarts.com/>, 6 pages.

Globosportsinc, “Bristle E-Dartboard,” [screenshots from YouTube video], Dec. 24, 2011, available online: <URL: https://www.youtube.com/watch?v=JIIb7XyssKU>, 29 pages.

Gurushida, “finnegan,” GitHub, Nov. 21, 2021, available online: <URL: https://github.com/gurushida/finnegan>, 6 pages.

Hener, P., “Dart-O-Mat 3000: About the project,” GitHub, Apr. 2019, available online: <URL: https://github.com/patrickhener/dart-o-mat-3000/blob/master/docs/About-the-project.rst>, 2 pages.

Hoettinher, H. , “opencv-steel-darts,” GitHub, May 8, 2019, available online: <URL: https://github.com/hanneshoettinger/opencv-steel-darts>, 7 pages.

Ironman Darts, “Unboxing and Demo: Prodigy Automatic Scoring Dartboard System on Ironman Darts,” [screenshots from YouTube video], May 12, 2022, available online: <URL: https://www.youtube.com/watch?v=IRzXqnm1GVg>, 17 pages.

Kettemann, D., “Capture Darts Scores,” GitHub, Jul. 11, 2020, available online: <URL: https://github.com/dkettemann/capture-darts-scores>, 4 pages.

Mardle, W., “Review by Wayne Mardle for the Scolia Darts System,” [screenshots from YouTube video], Mar. 31, 2020, available online: <URL: https://www.youtube.com/watch?v=uKXDyTe-NQ0>, 10 pages.

Mcnally, W., “DeepDarts,” GitHub, Jun. 14, 2021, available online: <URL: https://github.com/wmcnally/deep-darts>, 5 pages.

Mcnally, W., “DeepDarts: Modeling Keypoints as Objects for Automatic Scorekeeping in Darts using a Single Camera,” 2021 IEEE/CVF Conference on Computer Vision and Pattern Recognition Workshops (CVPRW), Jun. 2021, available online: <URL: https://openaccess.thecvf.com/content/CVPR2021W/CVSports/papers/McNally_DeepDarts_Modeling_Keypoints_as_Objects_for_Automatic_Scorekeeping_in_Darts_CVPRW_2021_paper.pdf>, 10 pages.

Rodriguez, T. et al., “Shoot Your Shot!” Hackster, Dec. 3, 2019, available online: <URL: https://www.hackster.io/shoot_it/shoot-your-shot-3756ef>, 5 pages.

Scolia Darts, “Automatic dart scoring system,” [website], available as early as Jun. 2022 online: <URL: https://scoliadarts.com/>, 8 pages.

Unicorn Darts, “Unicorn Smartboard—Darts Activation,” [screenshots from YouTube video], Dec. 1, 2017, available online: <URL: https://www.youtube.com/watch?v=QeKlmHimfgo>, 22 pages.

Unicorn Products Ltd, “Unicorn Smartboard Darts re-invented to be fun for everyone,” [website], available as early as Jun. 2022 online: <URL: https://www.playwiththebest.com/smartboard.html>, 2 pages.

Vass, L., “Darts hit recognition using opencv,” GitHub, Feb. 28, 2019, available online: < URL: https://github.com/vassdoki/opencv-darts>, 4 pages.

Winmau Dartboard Company Limited, “Winmau Partners with Auto-scoring Steeltip Darts Brand FidoDarts,” Jan. 11, 2019, available online: <URL: https://winmau.com/news/post/winmau-partners-with-auto-scoring-steeltip-darts-brand-fidodarts>, 4 pages.

Search Report under Section 17 for European Patent Application No. GB2314147.6, mailed Feb. 21, 2024, 4 pages.

Extended European Search Report for European Patent Application No. 24200592.4, mailed Mar. 26, 2025, 13 pages.

Communication Pursuant to Rule 114(2) EPC for European Patent Application No. 24200592.4 mailed Feb. 17, 2026, 8 pages.

* cited by examiner

DARTS SCORING METHOD

CROSS-REFERENCE TO RELATED APPLICATIONS

This application claims priority to United Kingdom Patent Application No. 2314147.6 filed on Sep. 15, 2023, wherein the entire contents of the foregoing application are hereby incorporated by reference herein.

TECHNICAL FIELD

The present invention relates to a method of determining a score of a dart in a play surface of a dartboard, and a dartboard scoring system for carrying out the method.

BACKGROUND

The sport of darts is played around the world at all levels. A game of darts is played by a player throwing a number of darts at a typically circular dartboard. The dartboard is split into a number of segments, each corresponding to a different score value, and the score from a throw is determined based on which segment the dart lands in. To win a game, a player must be the first player to score a certain amount of points, typically 301 or 501 points.

Historically, the score achieved from a throw is determined by the player simply observing which segment a dart has landed in. Players then must make a note of all the scores, and manually add them up as the game progresses. In recent years, however, a number of dartboard scoring systems have been developed which are able to automatically determine the score of a throw, and consequently track the overall score of a player. Many of these systems are known as “e-dart” or “soft-tip dart” systems, which employ darts with plastic tips and an electronic dartboard, and receptors within the dartboard are used to determine the score of a throw.

However, many darts players prefer to play with more traditional equipment, such as darts that have steel tips and bristle dartboards. There are currently very few commercially available traditional “steel-dart” systems that provide automatic scoring. The steel-dart systems that do exist that provide automatic scoring typically do so by employing a number of cameras that lie parallel to the plane of the dartboard, and use triangulation techniques on the images captured by the cameras to determine where a dart lies on the dartboard. Such systems require pre-programmed knowledge of the various angles and positions for each camera, and so can be difficult to calibrate correctly.

There is therefore a need for an automatic scoring system which can be used with traditional steel-tip darts and bristle dartboards, which is both easy to use and accurate with its scoring.

SUMMARY

According to a first aspect of the present invention, a method of determining a score of a dart in a play surface of a dartboard is provided, the method using a plurality of cameras facing the dartboard, wherein a direction of view of each of the plurality of cameras is at a non-zero angle relative to a plane containing the play surface of the dartboard, the method comprising: calculating a homography matrix for each camera within the plurality of cameras, the homography matrix being for transforming an image of the dartboard captured by the respective camera from a view of the respective camera to a front-view of the dartboard; capturing a first image of the dartboard using each of the cameras at a first time, and capturing a second image of the dartboard using each of the plurality of cameras at a second time, the second time being subsequent to the first time, and the dart being in the play surface of the dartboard at the second time; producing a plurality of differential scoring images by comparing each first image to the second image captured by the respective camera; using at least two of the differential scoring images with their respective homography matrices to determine a location of intersection between the dart and the play surface of the dartboard; and determining a score based on the determined location of intersection.

The method of the first aspect can be used regardless of the type of dartboard or dart used during play, as it relies on image processing to determine a score, rather than any sensors within the dartboard and/or dart themselves. Furthermore, the principle of homography is used to ensure that the images captured by each camera, regardless of its angle or position relative to the dartboard, can be compared to a common reference image (i.e., the front-view of the dartboard). Thus, a versatile and widely-applicable method of determining a darts score is provided by the method of the first aspect.

The plurality of cameras may face the dartboard in such a way that the entirety of the dartboard is present within the view of each camera. The direction of view of each of the plurality of cameras may be at an angle of between 15 degrees and 45 degrees relative to the plane containing the play surface of the dartboard, optionally between 20 and 40 degrees relative to the plane containing the play surface of the dartboard, or more particularly at an angle of 23 degrees relative to the plane containing the play surface of the dartboard. The direction of view of a camera may be parallel to and/or aligned with the central axis of the camera’s field of view.

The plurality of cameras may be equiangularly spaced around the dartboard. The directions of view of two adjacent cameras of the plurality of cameras may be positioned at approximately 90 degrees to one another, when viewed from a front of the dartboard. For example, the directions of view of two adjacent cameras of the plurality of cameras may be positioned at between 45 degrees and 135 degrees to one another, or more particularly between 80 degrees and 100 degrees to one another. Adjacent cameras of the plurality of cameras may be cameras that do not have any other cameras of the plurality cameras positioned between them. The positioning of the adjacent cameras at an angle to one another may enable a good variety of viewing angles of the dart to be obtained, thereby allowing more accurate measurement of the score.

The method may include illuminating the play surface of the dartboard using an illumination device. The illumination device may be arc-shaped or ring-shaped. In particular, the illumination device may be in the shape of an arc of at least 90 degrees, and optionally between 180 degrees and 300 degrees. For example, approximately 270 degrees. The illumination device may be attached to a frame, and the frame may form at least part of the arc-shape or the ring-shape. The illumination device may be a strip of LEDs.

The frame may be configured to be spaced radially outwardly from the dartboard in use, and the illumination device may be attached to the frame such that it faces the play surface of the dartboard. In this way, it can be ensured that the play surface of the dartboard is illuminated as homogeneously as possible, thereby removing the presence of shadows in any captured images of the dart that may adversely affect the score determination. Additionally, when spaced radially away from the dartboard, the frame will not obstruct the dartboard when darts are thrown.

Homography is used to relate two images of the same planar surface in space to one another. In this instance, the homography matrix for a respective camera relates the images of the planar play surface captured by the camera to a front-view of the play surface. The homography matrix for a respective camera may be calculated based on a reference image captured by the camera. The reference image may be an image of the dartboard without any dart present. The method may therefore include capturing a reference image using each of the cameras, for example prior to the start of play. Each reference image may be compared with a front-view image of the dartboard and the homography matrix of the respective camera may be determined based on this comparison. In this way, each location in the reference image may be correlated with a corresponding location in the front-view of the camera by applying the homography matrix to the location in the reference image.

In particular, the homography matrix may be calculated based on a plurality of reference points identified in the respective reference image. The reference points may correspond to a plurality of predetermined locations on the dartboard. For example, the reference points may correspond to particular locations around the edge of the dartboard and/or to the bull's eye of the dartboard. The positions of the predetermined locations in the front-view of the dartboard may be known. For example, the method may include using a memory to store the positions of the predetermined locations in the front-view of the dartboard. The method may therefore include retrieving the stored positions from the memory when calculating the homography matrices.

The homography matrix may be calculated by comparing the reference points identified in the respective reference image with the positions of the predetermined locations in the front-view of the camera (i.e., by comparing the reference points identified in the respective reference image with the stored positions).

The reference points may be identified by computer-based image analysis of the respective reference image. In this way, the reference points can be automatically identified in the reference image without requiring input from the user. The method may include displaying the reference image with its respective reference points overlaid, for example on a screen. The method may include adjusting the position of the reference points based on input from the user.

Alternatively, the reference points may be identified based on input from a user. For example, the method may include displaying the reference image to the user, for example on a screen, and receiving input from the user indicating the location of the reference points in that reference image. The method may include receiving input from the user via a touch-screen displaying the reference image.

The method may include storing a scoring pattern of the front-view of the dartboard in the memory. The scoring pattern may comprise information relating to the score associated with a given location in the front-view of the dartboard. For each camera of the plurality of cameras, the method may include assigning a score value to each location in the view of the camera based on the scoring pattern and the respective homography matrix. The method may include using the scoring pattern together with the determined location of intersection to determine the score.

The method may include adjusting at least one of the homography matrices based on input from a user. For example, the method may include applying the scoring pattern of the front-view of the dartboard onto each reference image using the respective homography matrix, and displaying the resulting images (for example, on a screen) to the user. The user may then be able to identify if the calculated homography matrix for a camera is acceptable based on whether the scoring pattern is applied correctly to the respective reference image. If the user determines that the homography matrix should be adjusted, the user may be able to provide input to adjust the position of the scoring pattern on the reference image, e.g. through the screen. The user may, for example, be able to align the scoring pattern correctly on the reference image, and the homography matrix may be adjusted based on this new alignment. In this way, the user can ensure that the method proceeds using correct homography matrices, and more accurate scores can therefore be obtained.

The method may include capturing an intermediate image of the dartboard using at least one of the plurality of cameras, the or each intermediate image being captured subsequent to the first time and prior to the second time. The method may include producing one or more differential throw images by comparing the or each intermediate image to the first image captured by the respective camera. The method may include processing the differential throw images to produce a contour of any dart that might be present in the image. The processing of the differential throw image may include reducing the differential throw image to a predetermined region of interest, such as a region in which the dartboard lies. This may include removing pixels from the differential throw image that fall outside of the predetermined region of interest. In other words, the processing of the differential throw image may include removing the background of the image, the background being any part of the image that does not contain the dart or the dartboard. The processing may include determining a grayscale value of each pixel in the differential throw image and removing any pixels with a greyscale value falling below a predetermined greyscale value. The predetermined greyscale value may be between 25% and 75%, more particularly 50%. The processing may include performing at least one morphological operation on the differential throw image, such as a dilation operation and/or an erosion operation. In this way, it may be ensured that the resulting contour does not include any features other than the dart, and any subsequent analysis based on the contour will be accurate.

The method may include determining that a dart has been thrown by comparing a number of pixels in the or each differential throw image to a throw threshold value. The determining that a dart has been thrown may be carried out after each differential throw image is processed. As such, the number of pixels that is compared to the throw threshold value may correspond to the number of pixels forming the contour of the dart produced during processing. If no dart is present in the differential throw image, the number of pixels may therefore be zero.

If it is determined that a dart is present in the differential throw image, the method may proceed to the determination of the score using the first and second images. Otherwise, a plurality of further intermediate images may be captured until a dart is detected based on the comparison of the latest intermediate image with the first image, and then the method may proceed to the determination of the score.

The intermediate image may be an image captured whilst the dart is mid-flight and/or shortly after the dart has hit the board. As such, the image of the dart may be blurry due to its movement. To address this, the plurality of second images may be captured after a predetermined sleep time following the determination that a dart has been thrown. The predetermined sleep time may be between Oms and 500 ms, optionally between 100 ms and 400 ms, and particularly about 300 ms. In this way, it can be ensured that the dart is in a stable state when the second images are captured, thereby enabling the position of the dart to be accurately measured.

The determining the location of intersection between the dart and the play surface of the dartboard may include producing a plurality of contour images of the dart based on the plurality of differential scoring images, for example by image processing each differential scoring image. Various features of the dart in a differential scoring image may be identified using the respective contour image, such as the tip of the dart and the main axis of the dart.

The image processing of a differential scoring image may include reducing the differential scoring image to a predetermined region of interest. The predetermined region of interest for the differential scoring images may be the same as the predetermined region of interest for the differential throw images. Alternatively, the predetermined region of interest for the differential scoring images may include a region that is slightly larger than the dartboard, such as a region including the dartboard and some of the area radially surrounding the dartboard. The reducing the differential scoring image to a predetermined region of interest may include removing pixels from the differential scoring image that fall outside of the predetermined region of interest.

The image processing of the differential scoring image may include determining a grayscale value of each pixel in the differential scoring image and removing any pixels with a greyscale value falling below a predetermined greyscale value. The predetermined greyscale value for the differential scoring image may be the same as that for the differential throw image. Alternatively, the predetermined greyscale value for the differential scoring image may be higher, for example between 70% and 90%, or more particularly 80%. The image processing of the differential scoring image may include performing at least one morphological operation on the differential scoring image, such as a dilation operation and/or an erosion operation.

The determining the location of intersection between the dart and the play surface of the dartboard may comprise using the differential scoring images with their respective homography matrix to determine a location of the dart point relative to the dartboard. This is because the dart intersects with the play surface of the dartboard at its dart point, and so the position of the dart point determines the score. In particular, the determining the location of intersection between the dart and the play surface of the dartboard may comprise determining the position of the dart point in each differential scoring image, determining the corresponding position of the dart point in the front-view of the dartboard using the respective homography matrix, and determining the location of intersection between the dart and the play surface of the dartboard based on the position of the dart point in the front-view of the dartboard.

Alternatively, or additionally, the determining the location of intersection between the dart and the play surface of the dartboard for each differential scoring image may comprise: applying the homography matrix to the respective differential scoring image to transform the image of the dart onto the front-view of the dartboard, determining a position of the dart point in the front-view of the dartboard, and determining the location of intersection between the dart and the play surface of the dartboard based on the position of the dart point in the front-view of the dartboard.

That is, the position of the dart point may be determined using either the transformed front-view image of the dart, in which case the homography matrix is applied to the contour of the dart, or the camera view image of the dart, in which case the homography matrix is applied to the dart point position.

As described above, the score may be determined based on the determined location of intersection between the dart and the play surface of the dartboard. Additionally, or alternatively, the score may be determined by determining the location of the dart point in each differential scoring image, and accessing the score associated with the each location, e.g. from the memory. In this case, for each camera, every pixel within the view of the camera may be assigned a score value based on the respective homography matrix. The assigned score values may then be stored, e.g. in the memory, for later consultation. Thus, the score may be additionally determined without determining the location of intersection between the dart and the play surface of the dartboard.

A second aspect of the present invention may therefore provide a method of determining a score of a dart in a play surface of a dartboard using a plurality of cameras facing the dartboard, wherein a direction of view of each of the plurality of cameras is at a non-zero angle relative to a plane containing the play surface of the dartboard, the method comprising: calculating a homography matrix for each camera within the plurality of cameras, the homography matrix being for transforming an image of the dartboard captured by the respective camera from a view of the respective camera to a front-view of the dartboard; assigning each pixel within the view of each camera a score value using the respective homography matrix for the camera; capturing a first image of the dartboard using each of the cameras at a first time, and capturing a second image of the dartboard using each of the plurality of cameras at a second time, the second time being subsequent to the first time, and the dart being in the play surface of the dartboard at the second time; producing a plurality of differential scoring images by comparing each first image to the second image captured by the respective camera; identifying the pixel location of the dart point in each differential scoring image; and determining a score based on the pixel locations of the dart point and their respective assigned score value.

The score may be an average of the score values of each pixel location of the dart point. The method may include storing the score value of each pixel in a memory. The determining the score may include accessing a plurality of score values from the memory for each identified pixel location of the dart point. The method of the second aspect may include any of the features of the first aspect of the invention.

Returning to the first aspect of the invention, the determining the location of intersection between the dart and the play surface of the dartboard may additionally, or alternatively, comprise using the at least two differential scoring images with their respective homography matrix to map a main axis of the dart in each differential scoring image onto the front-view of the dartboard. The main axes of the dart in each differential scoring image may intersect in the front-view of the dartboard at the location where the dart and the play surface of the dartboard intersect. The method may therefore further comprise determining at least one location of intersection between the main axes of the darts in each differential scoring image, when mapped onto the front-view of the dartboard; and determining the location of intersection between the dart and the play surface of the dartboard as the at least one location of intersection between the main axes of the darts in each differential scoring image, when mapped onto the front-view of the dartboard.

The score may be determined by comparing the location of intersection with the scoring pattern of the front-view of the dartboard. In this case, the location of intersection may be a location on the front-view of the dartboard, and the scoring pattern may comprise information relating to the score associated with that location. As such, the score may be determined by assigning a score value to the location of intersection based on the scoring pattern of the front-view of the dartboard.

A plurality of locations of intersection between the dart and the play surface of the dartboard may be identified due to discrepancies between the differential scoring images. For example, the determined position of the dart point may differ depending on the differential scoring image considered, and the determined location of intersection between one pair of main axes of the darts from one pair of differential scoring images may differ from the determined location of intersection between another pair of main axes of the darts of a different pair of differential scoring images. As such, the determining the location of intersection between the dart and the play surface of the dartboard may comprise determining a plurality of locations of intersection between the dart and the play surface of the dartboard. The method may therefore include determining a plurality of score values based on each location of intersection. Alternatively, if the same location of intersection is determined regardless of which differential scoring images were used, then only one location of intersection may be determined.

In this case, the method may include determining a weight value for each determined location of intersection, the weight value being indicative of a predicted reliability of the determined location. The method may include assigning a weight value to each score value of the plurality of score values. The weight value of the location of intersection may be equal to the weight value of the respective score value determined based on the location of intersection. The weight value may be determined based on one or more of: a number of pixels in the respective differential scoring image; a shape of a contour of the dart in the respective differential scoring image; the solidity of the contour of the dart in the respective differential scoring image; and the presence of other darts in the dartboard. For example, if the number of pixels in a differential scoring image is low, any locations of intersection determined from that differential scoring image may be assigned a lower weight value as compared to any locations of intersection determined from a differential scoring image with a higher number of pixels. The weight value may, for example, comprise a number between 0 and 1, and the sum of the weight values may equal 1.

The determining the score may be based on the determined locations of intersection and their respective weight values. A location of intersection with a low weight value may contribute less to the score than a location of intersection with a high weight value, and vice versa. In particular, the score may be determined as a weighted average of the plurality of score values. That is, the score may be determined by multiplying each score value with its assigned weight value, summing the multiplied values, and then dividing by a sum of the weight values. In other words, the score may be determined by multiplying the score value associated with each location of intersection with the weight value of the respective location of intersection, summing the multiplied values, and then dividing the summed value by a sum of the weight values. The determining the score may include discounting any locations of intersection and/or score values that have a weight value below a predetermined threshold. As such, the score may discount any locations of intersection and/or score values with a weight value below the predetermined threshold in its weighted average. The predetermined threshold value may, for example, be between 0 and 0.5, particularly between 0.2 and 0.3, and more particularly 0.25. In this way, a more accurate score may be obtained, which considers a plurality of data points based on their reliability.

The method may include displaying the score on the screen. The screen may be a touch-screen. Alternatively, the method may include transmitting the score to a user device, such as a mobile phone. The transmitting the score to a user device may be wireless, e.g. using Wi-Fi or Bluetooth. The method may include notifying the user of the score through any suitable means, including a speaker and/or an LED light display.

If shadows are present in the second image and/or the differential scoring image, for example due to poor or non-homogenous illumination, the determination of the score can be negatively impacted, as the shadows can be erroneously identified as forming part of the dart in the differential scoring images, and the resulting contour of the dart can be inaccurate. The method may therefore include transforming each differential scoring image and/or each second image to the front-view of the dartboard using the respective homography matrix. The method may include comparing each transformed differential scoring image and/or each second image to one another, and determining the regions of the image in which shadows are present based on this comparison. The method may include removing the regions in which shadows are present from each differential scoring image and/or each second image. The removing the regions in which shadows are present may occur prior to the determining of the location of intersection between the dart and the play surface of the dartboard. This may ensure that a more accurate score is obtained, which is not incorrectly skewed by the presence of shadows.

According to a third aspect of the present invention, a dartboard scoring system is provided comprising: a plurality of cameras configured to be mounted facing a dartboard such that a direction of view of each of the plurality of cameras is at a non-zero angle relative to a plane containing the play surface of the dartboard; a controller in communication with the plurality of cameras that is configured to calculate a homography matrix for each camera within the plurality of cameras, the homography matrix being for transforming an image of the dartboard captured by the respective camera from a view of the respective camera to a front-view of the dartboard; capture a first image of the dartboard using each of the cameras at a first time, and capturing a second image of the dartboard using each of the plurality of cameras at a second time, the second time being subsequent to the first time, and the dart being in the play surface of the dartboard at the second time; produce a plurality of differential scoring images by comparing each first image to the second image captured by the respective camera; use at least two of the differential scoring images with their respective homography matrices to determine a location of intersection between the dart and the play surface of the dartboard; and determine a score based on the determined location of intersection.

The controller is therefore configured to carry out the method of the first aspect. The controller may be configured to carry out any of the optional features of the first aspect. The controller may be configured to carry out the method of the second aspect, and may be configured to carry out any of the optional features of the second aspect.

The controller may be any suitable controller, such as a central processing unit (CPU). The controller may be configured to process the images captured by the cameras. For example, the controller may be configured to carry out morphological operations on the images, and/or may be configured to remove certain pixels in the images (e.g., based on their greyscale value). The controller may be configured to control the times at which the cameras capture the first images, the second images, and/or the intermediate images. The controller may comprise a memory. The memory may be the same as that according to the first aspect and/or the second aspect. The memory may therefore be configured to store the scoring pattern of the front-view of the camera, score values associated with the pixels in each camera view, etc.

The controller may comprise a wireless transceiver. The controller may be configured to communicate with a user device using the wireless transceiver. The controller may be in wireless communication with the plurality of cameras, for example Wi-Fi or Bluetooth communication. As such, one or more of the plurality of cameras may comprise a wireless transceiver. Alternatively, the controller may be connected to at least one of the plurality of cameras through wiring, and the controller may be configured to communicate with the plurality of cameras through a wired connection. The plurality of cameras may be connected to one another, for example through a wired or wireless connection.

The dartboard scoring system may comprise an illumination device for illuminating the dartboard. The illumination device may be arc-shaped or ring-shaped. In particular, the illumination device may be in the shape of a 270-degree arc. The illumination device may be configured to face the dartboard during use.

The dartboard scoring system may comprise a frame. The plurality of cameras and/or the illumination device may be attached to the frame. The frame may be for attachment to a wall or other surface through any suitable attachment means, for example a bracket. The frame may be arc-shaped or ring-shaped. The frame may be in the shape of a 270-degree arc. The frame may be formed of any suitable material, such as plastic and/or metal. The frame may comprise a ring-shaped or arc-shaped support and a plurality of arms extending from the support. The arms may be for providing attachment to a wall or other surface. Alternatively, the arms may be for providing attachment to a dartboard, for example to the sides of a dartboard. The arms may extend from a distal face of the support, such that, in use, the support is spaced from the surface to which the frame is attached by the arms. The support may have a diameter that is larger than the diameter of a standard dartboard (i.e., 45 cm). As such, in use, the support may at least partially surround the dartboard, but may be spaced radially outward from the edge of the dartboard. The illumination device may be attached to the support such that it faces the dartboard in use. The illumination device may span all or part of the circumference of the support.

The plurality of cameras may be housed in the arms of the frame. For example, each arm may comprise one of the cameras of the plurality of cameras. The cameras may be housed in the arms in such a way that each camera is facing the play surface of the dartboard during use. The arms (and therefore the cameras) may be positioned at equidistant locations around the circumference of the support. The frame may, for example, comprise four arms, and the dartboard scoring system may comprise four cameras. Each two adjacent arms may therefore be attached to the support at locations on the support that are approximately 90 degrees to one another.

The dartboard scoring system may be for use with a standard sized dartboard with a diameter of 45 cm and a thickness of 4 cm. The dartboard scoring system may be for use with a bristle dartboard and/or an electronic dartboard. The dartboard scoring system may be for us with steel-tip darts, plastic-tip darts, or e-darts.

A game of darts may typically be playing using a dartboard with a 45 cm diameter and a 4 cm thickness. The “oche” distance, i.e. the horizontal distance from the dartboard at which the player should stand, may be between 210 cm and 240 cm, particularly 237 cm. The dartboard may be at a vertical distance of between 170 cm and 180 cm from the floor to the centre of the bull’s eye, particularly at a distance of 173 cm from the floor to the centre of the bull’s eye.

BRIEF DESCRIPTION OF DRAWINGS

Certain embodiments of the disclosure will now be described by way of example only and with reference to the accompanying drawings in which.

DETAILED DESCRIPTION

Figure 1:
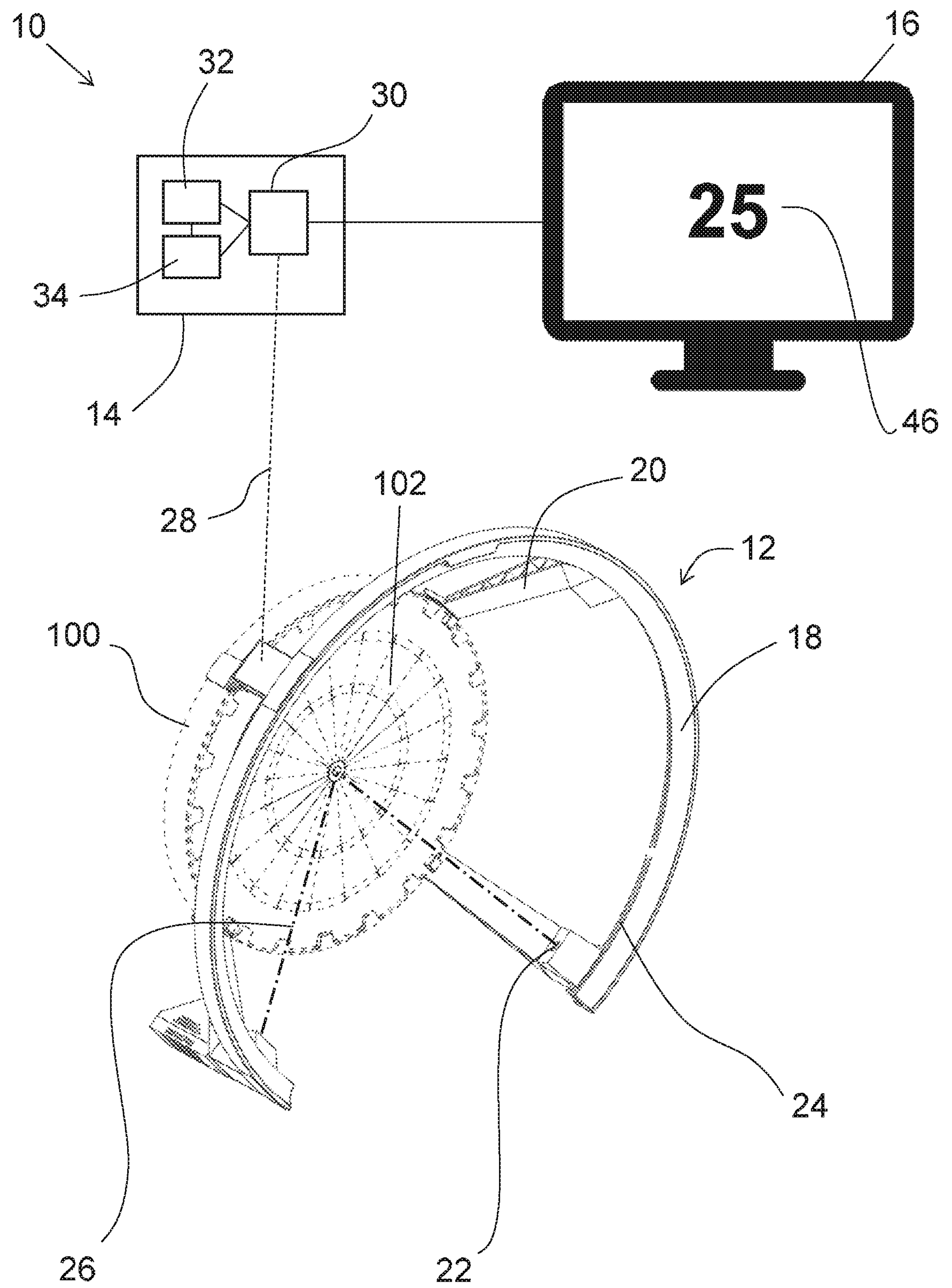
FIG. 1 shows a schematic drawings of a dartboard scoring system.

FIG. 1 shows a schematic diagram of a dartboard scoring system 10. The dartboard scoring system comprises a frame 12, a controller 14, and a screen 16. The frame 12 comprises an arc-shaped support 18 and a plurality of arms 20 extending from the support 18. The arms 20 are for attachment to a surface, such as a surface of the dartboard 100 or a wall adjacent the dartboard 100, so as to mount the frame such that the support 18 at least partially surrounds a dartboard 100. Each arm 20 comprises a camera 22 that is configured to face the play surface of the dartboard 100 in use. The support 18 comprises an illumination device 24, such as an LED strip, for illuminating the play surface of the dartboard 100 in use.

Figure 8:
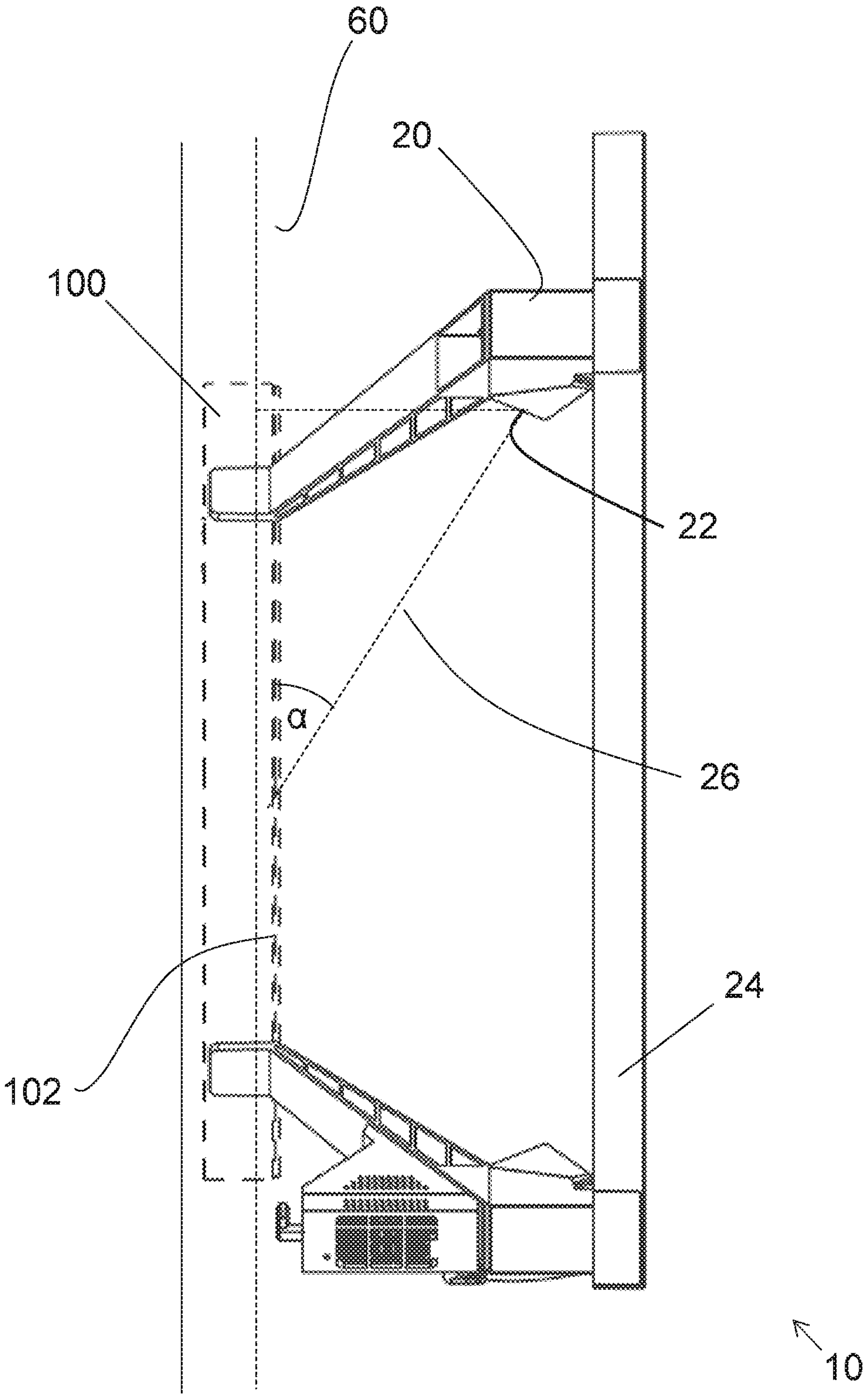
FIG. 8 shows a side view of the dartboard scoring system.

As can better shown in FIG. 8, a direction of view 26 of each camera 22 is at a non-zero angle relative to the plane containing the play surface 102 of the dartboard 100. In the example of FIG. 1, four cameras 22 are shown. The cameras 22 are configured to capture images of the play surface 102 of the dartboard 100 and communicate those images to controller 14. In particular, the cameras 22 communicate with a wireless transceiver 30 of the controller 14 via wireless communication path 28. Although the communication path 28 is shown between only one of the cameras 22 and the transceiver 30 in FIG. 1, it will be appreciated that all the cameras 22*a-d* are able to communicate with the transceiver 30.

The transceiver 30 is configured to communicate with a processor 32 and a memory 34 of the controller 14. The transceiver 30 communicates images received from the cameras to the processor 32 and the processor 32 can perform image analysis on the images. Additionally or alternatively, the transceiver 30 can communicates the images to the memory 34 for storage.

In other embodiments, the communication may be by wired communication, for example if the controller 14 is incorporated within or mounted to the frame 12.

The dartboard scoring system 10 is configured to carry out a method for determining a score 46 of a dart in a play surface 102 of the dartboard 100, said score 46 being displayed on a screen 16. In particular, the controller 14 processes images captured by cameras 22 using processor 34 in order to determine a score of a dart captured within the images. In order to do this, the images captured by the cameras 22 are related to a common reference image of the dartboard 100 in which the scores associated with each segment of the dartboard are known.

Figure 2:
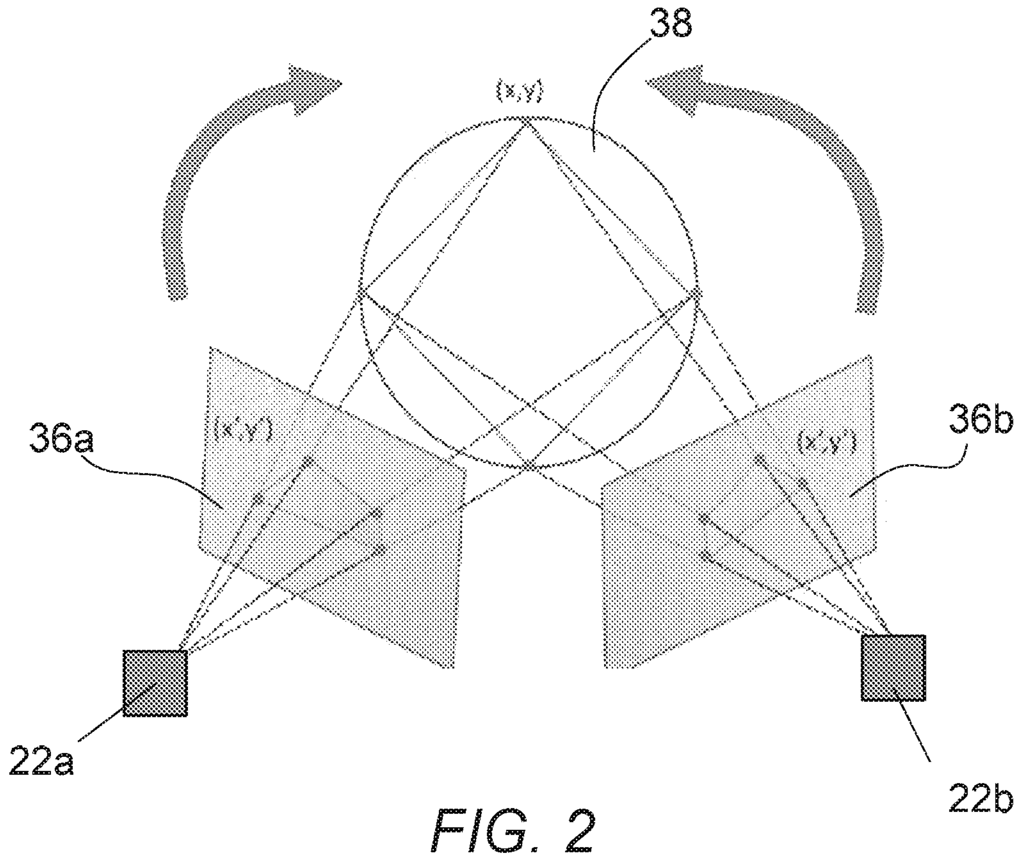
FIG. 2 shows a schematic image of the homography operations carried out on the images captured by the cameras in the dartboard scoring system.

As shown in FIG. 2, a first camera 22*a* of the plurality of cameras 22 has a first view 36*a*, whilst a second camera 22*b* of the plurality of cameras has a second view 36*b*, with the two views 36*a*, 36*b* lying in different planes. A homography matrix can therefore calculated for each camera 22 so that any points lying within the plane of the play surface 102 of the dartboard 100 in the view of the camera 22 can be translated to correspond a front-view image 38 of the dartboard 100, in which the scores associated with each location on the dartboard 100 are known.

Figure 3:
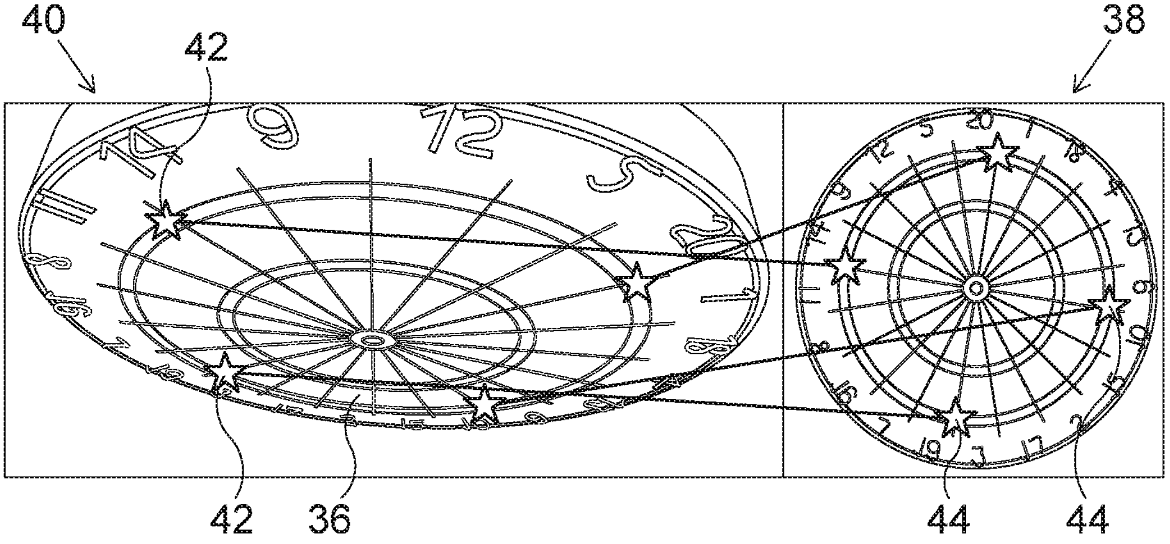
FIG. 3 shows images of the dartboard from different views with reference points overlaid.

To calculate the homography matrix for a given camera, the camera 22 captures a reference image 40 of the dartboard 100, as shown in FIG. 3. The reference image 40 captures an image of the dartboard 100 whilst no dart is present, in the view 36 of the camera 22. A number of reference points 42 are identified within the reference image 40, the reference points 42 corresponding to a plurality of predetermined locations on the dartboard 100. In FIG. 3, the reference points 42 correspond to locations around the edge of the dartboard playing surface 102. However, any suitable reference points may be used. The reference points 42 can be manually identified by a user (e.g., using the screen 16) or can be automatically identified by performing computer-based image analysis of the reference image 40.

The positions 44 of the predetermined locations in the front-view image 38 of the dartboard 100 are stored in the memory 34 of the controller 14. The homography matrix is calculated by retrieving the positions 44 from the memory 34 and comparing these positions 44 to the reference points 42 identified in the reference image 40.

Once the homography matrix is known, any point in the camera view 36 can be mapped onto the front-view 38, and the score associated with that point can therefore be determined. Particularly, a scoring pattern of the front-view 38 can be used to determine the score associated with a given point in the reference image 40 and/or the front-view 38.

The scoring pattern is stored in the memory 34 and comprises information regarding what score should be assigned to each position in the front-view 38 of the dartboard 100. As such, each position in the front-view 38 of the dartboard will have a score value associated with it, said score being stored in the memory 34.

Optionally, by using the respective homography matrix, each pixel in the camera view 36 can also be assigned a score value. The assigned score values of the pixels in each camera view 36 are stored in the memory 34 for later consultation when determining the score of a dart. The scoring pattern can be mapped, using the homography matrix, onto the reference image 40 captured by the camera 22 and displayed to the user via screen 16. The user can then check that the calculated homography matrix for that camera 22 is accurate by checking if the scoring pattern correctly aligns with the reference image 40 in the displayed image. The user can adjust the homography matrix by adjusting the position of the scoring pattern on the reference image 40.

Figure 4A:
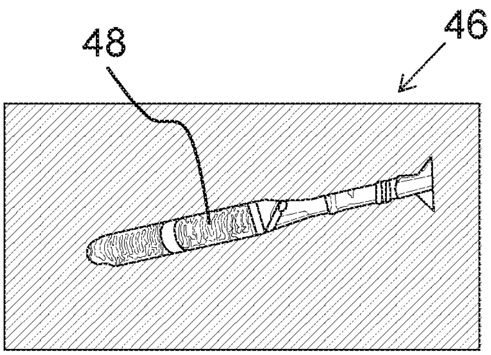
FIG. 4*a* shows a differential throw image of the dart.
Figure 4B:
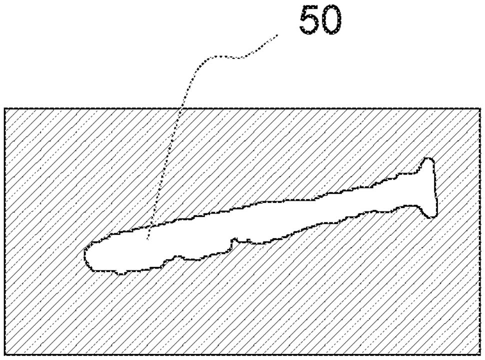
FIG. 4*b* shows a contour of the dart.

The score can only be determined once a dart has been thrown. The method therefore includes determining that a dart has been thrown, and calculating the score of the dart once this determination has been made. To do this, a plurality of first images are captured by each camera 22 at a first time, and a plurality of intermediate images are captured by each camera 22 at a time subsequent to this first time. The first images are captured prior to a dart throw, whilst the intermediate images are captured after the dart has been thrown, either whilst still travelling in the air, or after the dart has hit the dartboard. The first images and intermediate images are transmitted to the controller 14 via pathway 28. To determine that a dart has been thrown, each first image is subtracted from the respective intermediate image using the processor 32, or vice versa, to produce a differential throw image 46, as shown in FIG. 4*a*. The differential throw image 46 isolates the dart 48 from the background. The processor 32 performs a number of image processing operations on the differential throw image 46, including morphological operations and filtering operations, in order to produce a contour 50 of the dart 48 as shown in FIG. 4*b*. The number of pixels in this contour 50 are compared to a pixel threshold value. If the number of pixels is greater then the pixel threshold value, the processor 32 determines that a dart has been thrown. Otherwise, the processor 32 determines that no dart has been thrown, and further intermediate images are captured and compared with the first image until a dart is detected.

It will be appreciated that other image analysis techniques may be used to identify when a dart is detected within the intermediate images. Furthermore, in other embodiments, the scoring may not be automatic, but instead a user of the system 10 may inform the system 10 when a dart has been thrown and should be scored.

Once it has been determined that a dart has been thrown, the score associated with that dart 48 is determined. To do this, a plurality of second images are captured by each camera 22 at a second time, the second time being subsequent to both the first time and the time at which the intermediate images are captured. The second images are captured after a predetermined sleep time of 300 ms following the determination that a dart has been thrown. This gives the dart 48 time to stablise after it has hit the dartboard 100, thereby ensuring that the image of the dart 48 upon which the score is based is not blurred.

Figure 5:
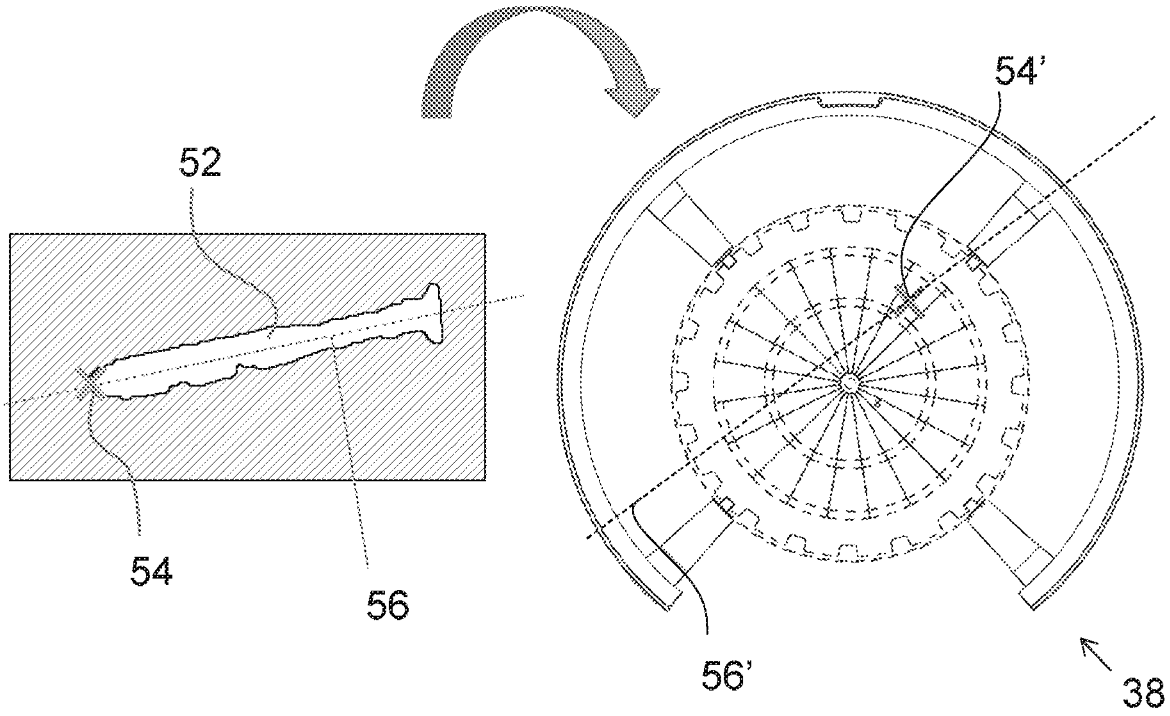
FIG. 5 shows the transformation of the dart point position and the main axis of the dart onto a front-view of the dartboard.

Each second image is subtracted from the respective first image, or vice versa, to produce a differential scoring image. The processor 32 performs a number of image processing operations on the differential scoring image—as done for the differential throw image—to produce a contour 52 of the dart, as shown in FIG. 5. Various features of the dart 52 can be identified based on the contour 52, such as the dart point position 54 in the camera view 36 and the main axis 56 of the dart 48 in the camera view 36.

Using the respective homography matrix, the dart point position 54' and the main axis 56' of the dart in the front-view 38 of the dartboard 100 can be determined, as shown in FIG. 5. For the dart point position 54', a score can be determined by consulting the scoring pattern and finding the score associated with that position in the front-view 38 of the camera. Alternatively, the score can be determined based on the dart point position 54 in the camera view 36 by retrieving the score value associated with that position, as determined when calculating the homography matrices, from the memory 34. Thus, a score value can be determined based on the identified dart point position 54 in each differential scoring image. In the example of FIG. 1, this would mean four score values are determined based on the identified dart point position 54.

Further score values can be determined using the main axes 56 of the dart 48 in the differential scoring images. This is described in further detail with reference to FIGS. 6 and 7.

Figure 6:
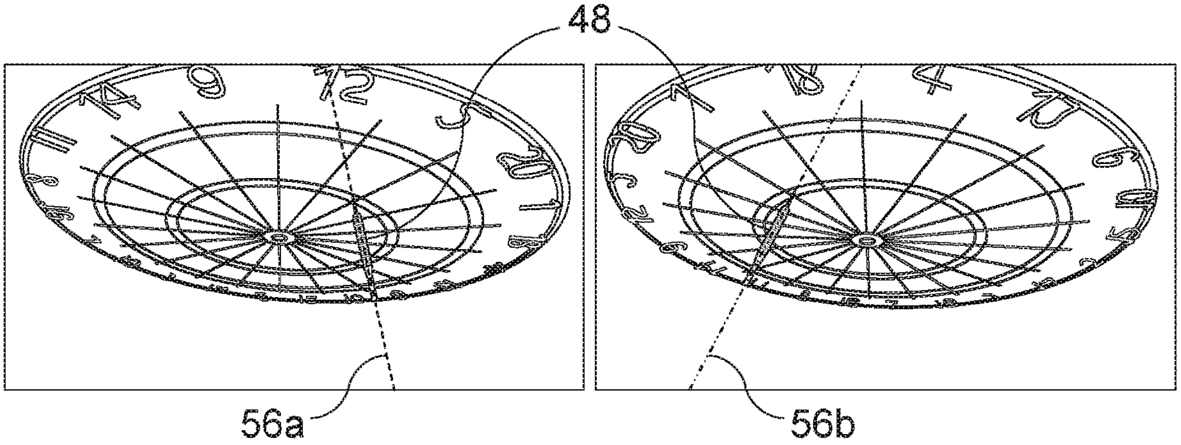
FIG. 6 shows the main axes of the dart from different camera views.

FIG. 6 shows two images of the dart 48 taken from different cameras 22. These images correspond to the second images of the dart 48. The main axis 56*a* of the dart 48 in the left image is at a different angle to the main axis 56*b* of the dart 48 in the right image due to the difference in direction of the camera views.

Figure 7:
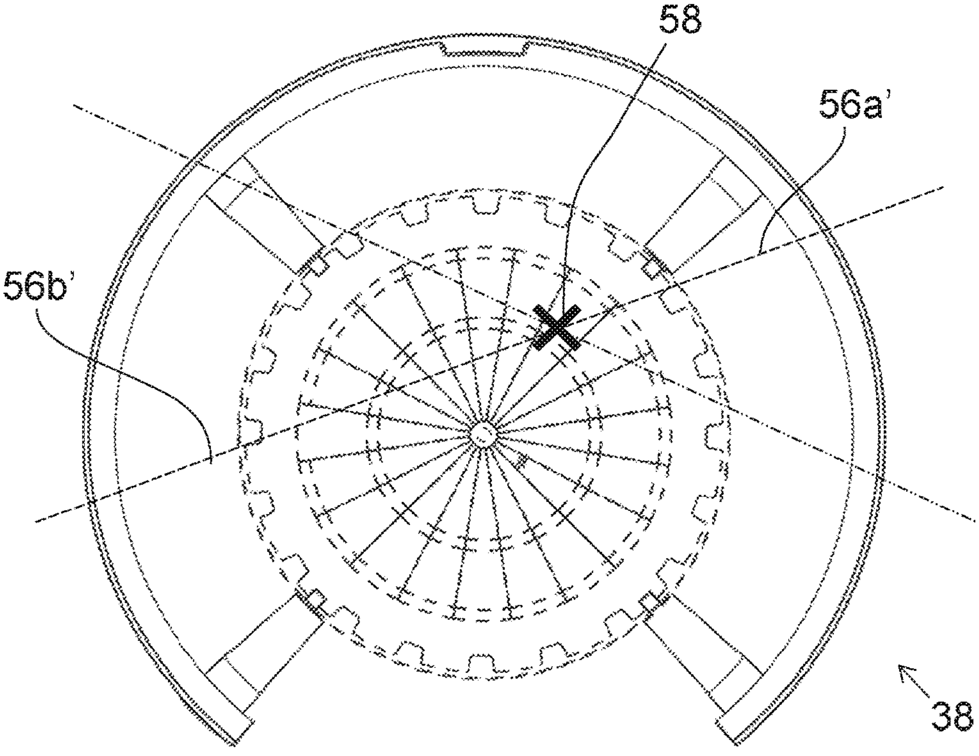
FIG. 7 shows the main axes shown in FIG. 6 transformed onto the front-view of the dartboard.

FIG. 7 shows the main axes 56*a*', 56*b*' mapped onto the front-view 38 of the dartboard 100 using the respective homography matrices of the cameras 22. The point of intersection 58 between the main axes 56*a*', 56*b*' in the front-view 38 corresponds to the location at which the dart 48 intersects with the dartboard 100. This is because the homography matrices transform the plane of the play surface 102 of the dartboard 100 to the plane of the play surface 102 when viewed from the front. Therefore only the location where the dart 46 intersects with the play surface 102 in each of the respective camera views will be mapped to the same location in the front view.

This principle also allows any shadows present in the images to be removed. If a shadow is present, for example due to poor or non-homogenous illumination, it would also be present in the differential images. However, as a shadow will fall across the play surface 102 of the dartboard 100, it will be transformed to the same location in the front-view by each of the homography matrices. Therefore, a shadow can be identified as parts of two transformed differential images that are in the same location, and can therefore be removed from the differential images before calculating the tip location 54 and/or the main axis 56 of the dart 46. This may ensure that a more accurate score is obtained, which is not incorrectly skewed by the presence of shadows.

Thus, the point of intersection 58 between the main axes 56*a*', 56*b*' can be used to determine a score value of the dart 48 using the scoring pattern. Whilst only two main axes have been considered in FIGS. 6 and 7, it will be appreciated that any pair of main axes can be used to determine a score value. In the case of FIG. 1, where there are four cameras and therefore four different main axes that can be mapped onto the front-view 38, six score values can be determined.

Thus, in the example of FIG. 1, ten score values may be obtained based on the differential scoring images. These ten score values may all be identical, in which case the final score is the value of the ten score values. However, due to discrepancies between the differential scoring images, some score values may differ from other score values. For example, the dart may be partly obscured by another dart when viewed from certain cameras 22. In the case of disagreement between the score values, the final score may be an average of all of the score values. Alternatively, the processor 32 may determine a weight value for each score value that represents the predicted reliability of the score value. This weight value may be based on whether other darts are already present on the dartboard, the number of pixels in the contour of the dart, the shape of the contour of the dart, and/or the solidity of the contour of the dart. In this case, the score is calculated as the weighted average of the score values. Some score values may be discounted from the weighted average if their weight value is below a predetermined threshold value.

A side view of the dartboard scoring system 10 is shown in FIG. 8. Here, the angle $\alpha$ between the centre axis of the field of view 26 of one of the cameras 22 and the plane 60 in which the play surface 102 lies is shown more clearly. The angle $\alpha$ is preferably around 23 degrees. FIG. 8 further shows the attachment of the arms 20 to the sides of the dartboard 100.

Figure 9:
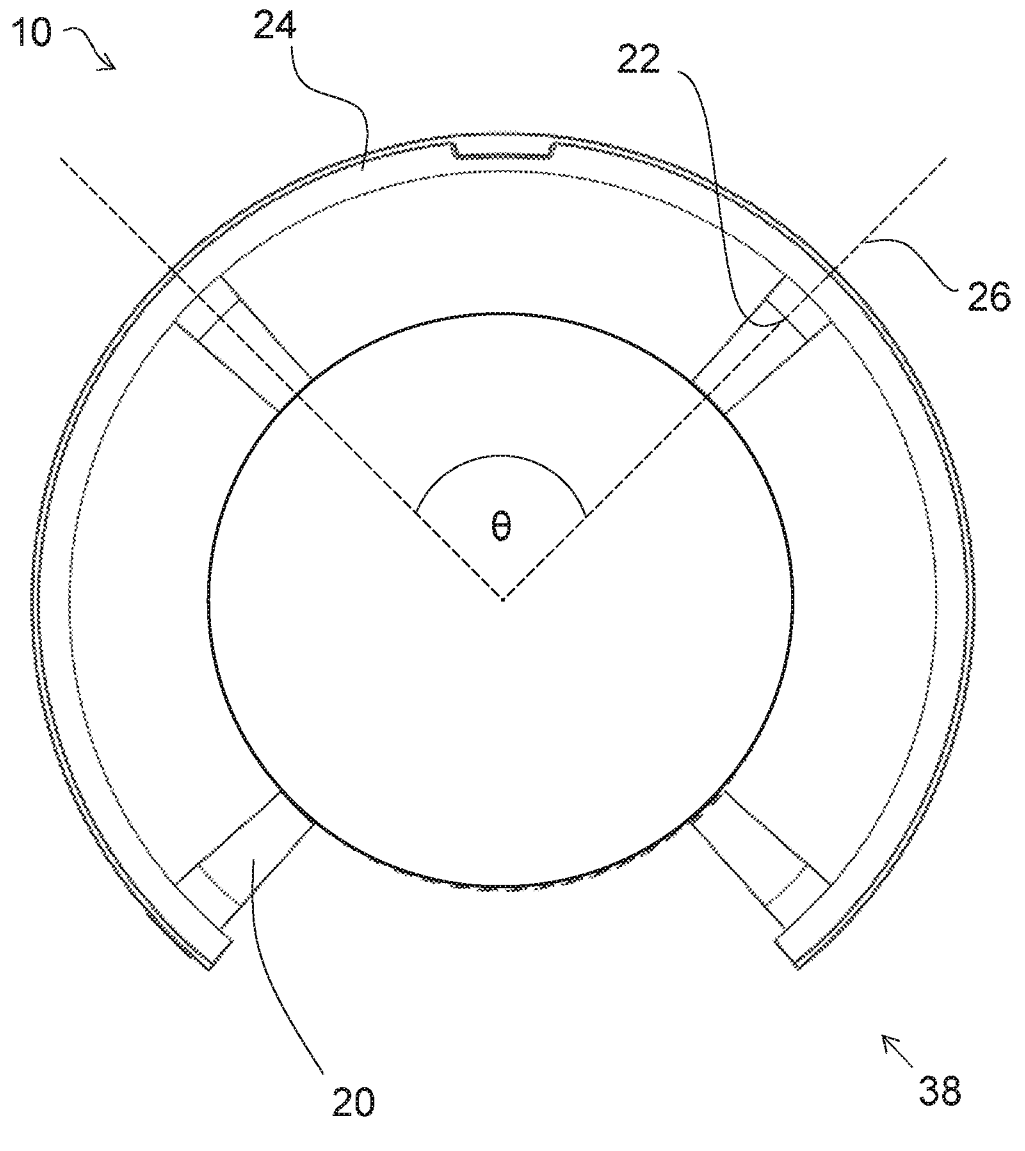
FIG. 9 shows a front-view of the dartboard scoring system.

FIG. 9 shows the front-view of the dartboard scoring system 10, in which it can be seen that the fields of view 26 of adjacent cameras 22 are at an angle $\theta$ to one another. The angle $\theta$ is preferably around 90 degrees, such that the fields of view 26 are approximately perpendicular to one another.

Whilst four cameras 22 are shown in the preferred embodiment, it is envisaged that three cameras 22 would still provide accurate scoring for a standard game of darts in which three darts are thrown. The techniques above could also be applied to a system with only two cameras 22, or to a system with more than four cameras 22.

What is claimed is:

1. A method of determining a score of a dart in a play surface of a dartboard using a plurality of cameras facing the dartboard, wherein a direction of view of each of the plurality of cameras is at a non-zero angle relative to a plane containing the play surface of the dartboard, the method comprising:

calculating a homography matrix for each camera within the plurality of cameras, the homography matrix being for directly transforming an image of the dartboard captured by the respective camera from a view of the respective camera to a front-view of the dartboard;

capturing a first image of the dartboard using each of the cameras at a first time, and capturing a second image of the dartboard using each of the plurality of cameras at a second time, the second time being subsequent to the first time, and the dart being in the play surface of the dartboard at the second time;

producing a plurality of differential scoring images by comparing each first image to the second image captured by the respective camera;

using at least two of the differential scoring images with their respective homography matrices to transform each of the at least two of the differential scoring images from the view of the respective camera to the front-view of the dartboard;

determining a location of intersection between the dart and the play surface of the dartboard based on the transformed differential scoring images; and determining a score based on the determined location of intersection.

2. The method of claim 1, wherein the directions of view of two adjacent cameras of the plurality of cameras are positioned at approximately 90 degrees to one another.

3. The method of claim 1, further comprising:

illuminating the play surface of the dartboard using an illumination device.

4. The method of claim 1, wherein each homography matrix is calculated based on a reference image captured by the respective camera, the reference image being an image of the dartboard without any dart present.

5. The method of claim 4, wherein each homography matrix is calculated based on a plurality of reference points identified in the respective reference image, the reference points corresponding to a plurality of predetermined locations on the dartboard.

6. The method of claim 5, wherein reference points of the plurality of reference points are identified by computer-based image analysis of the respective reference image.

7. The method of claim 1, further comprising:

adjusting at least one of the homography matrices based on input from a user.

8. The method of claim 1, wherein the determining the location of intersection between the dart and the play surface of the dartboard comprises:

producing a plurality of contour images of the dart based on the plurality of differential scoring images.

9. The method of claim 1, wherein the determining the location of intersection between the dart and the play surface of the dartboard comprises:

using the differential scoring images with their respective homography matrix to determine a location of the dart point on the dartboard.

10. The method of claim 1, wherein determining the location of intersection between the dart and the play surface of the dartboard comprises:

using the at least two differential scoring images with their respective homography matrix to map a main axis of the dart in each differential scoring image onto the front-view of the dartboard;

determining at least one location of intersection between the main axes of the darts in each differential scoring image, when mapped onto the front-view of the dartboard; and determining the location of intersection between the dart and the play surface of the dartboard as the at least one location of intersection between the main axes of the darts in each differential scoring image, when mapped onto the front-view of the dartboard.

11. The method of claim 1, wherein the method includes displaying the score on a screen.

12. A dartboard scoring system comprising:

a plurality of cameras configured to be mounted facing a dartboard such that a direction of view of each of the plurality of cameras is at a non-zero angle relative to a plane containing the play surface of the dartboard; and a controller in communication with the plurality of cameras that is configured to carry out the method of claim 1.

13. The dartboard scoring system of claim 12, further comprising an illumination device for illuminating the dartboard.

14. The dartboard scoring system of claim 12, further comprising a screen for displaying a score.

15. A method of determining a score of a dart in a play surface of a dartboard using a plurality of cameras facing the dartboard, wherein a direction of view of each of the plurality of cameras is at a non-zero angle relative to a plane containing the play surface of the dartboard, the method comprising:

calculating a homography matrix for each camera within the plurality of cameras, the homography matrix being for transforming an image of the dartboard captured by the respective camera from a view of the respective camera to a front-view of the dartboard;

capturing a first image of the dartboard using each of the cameras at a first time, and capturing a second image of the dartboard using each of the plurality of cameras at a second time, the second time being subsequent to the first time, and the dart being in the play surface of the dartboard at the second time;

producing a plurality of differential scoring images by comparing each first image to the second image captured by the respective camera;

using at least two of the differential scoring images with their respective homography matrices to determine a location of intersection between the dart and the play surface of the dartboard;

determining a score based on the determined location of intersection;

capturing at least one intermediate image of the dartboard using at least one of the plurality of cameras, the at least one intermediate image being captured subsequent to the first time and prior to the second time;

producing one or more differential throw images by comparing the at least one intermediate image to the first image captured by the respective camera; and determining that a dart has been thrown by comparing a number of pixels in the one or more differential throw images to a throw threshold value.

16. The method of claim 15, wherein the plurality of second images is captured after a predetermined sleep time following the determination that a dart has been thrown.

17. A method of determining a score of a dart in a play surface of a dartboard using a plurality of cameras facing the dartboard, wherein a direction of view of each of the plurality of cameras is at a non-zero angle relative to a plane containing the play surface of the dartboard, the method comprising:

calculating a homography matrix for each camera within the plurality of cameras, the homography matrix being for transforming an image of the dartboard captured by the respective camera from a view of the respective camera to a front-view of the dartboard;

capturing a first image of the dartboard using each of the cameras at a first time, and capturing a second image of the dartboard using each of the plurality of cameras at a second time, the second time being subsequent to the first time, and the dart being in the play surface of the dartboard at the second time;

producing a plurality of differential scoring images by comparing each first image to the second image captured by the respective camera;

using at least two of the differential scoring images with their respective homography matrices to determine a location of intersection between the dart and the play surface of the dartboard; and determining a score based on the determined location of intersection;

wherein determining the location of intersection between the dart and the play surface of the dartboard comprises:

determining a plurality of locations of intersection between the dart and the play surface of the dartboard; and determining a weight value for each determined location, the weight value being indicative of a predicted reliability of the determined location.

18. The method of claim 17, wherein the weight value is determined based on one or more of: a number of pixels in the respective differential scoring image; a shape of a contour of the dart in the respective differential scoring image.

* * * * *